(12) United States Patent
Hayashi

(10) Patent No.: US 10,436,134 B2
(45) Date of Patent: Oct. 8, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Keisuke Hayashi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/944,840

(22) Filed: Apr. 4, 2018

(65) Prior Publication Data

US 2018/0306135 A1 Oct. 25, 2018

(30) Foreign Application Priority Data

Apr. 25, 2017 (JP) ................. 2017-086260

(51) Int. Cl.
*F02D 41/02* (2006.01)
*F02P 5/15* (2006.01)
(Continued)

(52) U.S. Cl.
CPC ........... *F02D 41/0255* (2013.01); *F01N 3/10* (2013.01); *F02B 31/00* (2013.01); *F02D 41/0245* (2013.01); *F02D 41/1498* (2013.01); *F02D 41/402* (2013.01); *F02M 63/0225* (2013.01); *F02P 5/045* (2013.01); *F02P 5/15* (2013.01);
(Continued)

(58) Field of Classification Search
CPC ...... F02D 13/0211; F02D 41/34; F02D 43/00; F02D 45/00; F02D 2041/001; F02D 41/0245; F02D 41/064; F02D 41/3041; F02D 41/3094; F02D 41/402; F02D 2041/0015; F02D 29/02; F02D 41/0255; F02M 61/182; F02M 61/14; F02P 5/1502;
(Continued)

(56) References Cited

U.S. PATENT DOCUMENTS

| 2002/0134346 A1* | 9/2002 | Yamauchi | F02B 23/104 123/295 |
| 2002/0189582 A1* | 12/2002 | Mamiya | F02D 37/02 123/295 |

(Continued)

FOREIGN PATENT DOCUMENTS

| JP | 2007-032376 A | 2/2007 |
| JP | 2009-024682 A | 2/2009 |

(Continued)

*Primary Examiner* — Sizo B Vilakazi
(74) *Attorney, Agent, or Firm* — Sughrue Mion, PLLC

(57) ABSTRACT

When it is determined that the combustion state during the catalyst warm-up control is unstable, an additional ignition is performed on the TDC side relative to the discharge period CP. In a first countermeasure example, an additional ignition period $CP_2$ is provided on the TDC side relative to the ignition period $CP_1$ at the normal time while performing normal ignition and injection. A second countermeasure example is carried out when it is determined that the combustion state is still unstable despite the first countermeasure example. In the second countermeasure example, an additional ignition period $CP_3$ which is a longer period than the additional ignition period $CP_2$ is provided instead of the additional ignition period $CP_2$.

5 Claims, 8 Drawing Sheets

(51) Int. Cl.
*F02B 31/00* (2006.01)
*F02M 63/02* (2006.01)
*F01N 3/10* (2006.01)
*F02D 41/14* (2006.01)
*F02D 41/40* (2006.01)
*F02P 5/04* (2006.01)
*F02P 15/08* (2006.01)
*F02D 41/00* (2006.01)

(52) U.S. Cl.
CPC ...... *F02P 15/08* (2013.01); *F02D 2041/0015* (2013.01); *F02D 2200/101* (2013.01); *F02D 2250/28* (2013.01); *Y02T 10/146* (2013.01)

(58) Field of Classification Search
CPC ..... F02P 5/1506; F02B 23/105; F01N 3/2896; F01N 3/204
See application file for complete search history.

(56) References Cited

U.S. PATENT DOCUMENTS

| | | | | |
|---|---|---|---|---|
| 2003/0121495 | A1* | 7/2003 | Abo | F02B 17/005 |
| | | | | 123/295 |
| 2009/0025682 | A1 | 1/2009 | Okamoto | |
| 2018/0298832 | A1* | 10/2018 | Hoshi | F02D 13/0211 |

FOREIGN PATENT DOCUMENTS

| | | |
|---|---|---|
| JP | 2009-275671 A | 11/2009 |
| JP | 2010-048212 A | 3/2010 |
| JP | 2011-007046 A | 1/2011 |
| JP | 2011-106377 A | 6/2011 |

\* cited by examiner

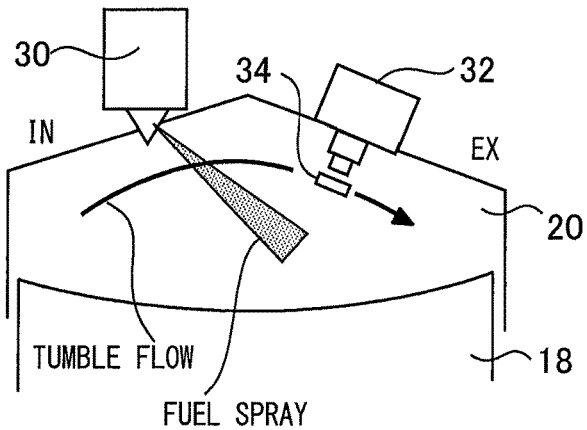
DURINGE INTAKE STROKE INJECTION
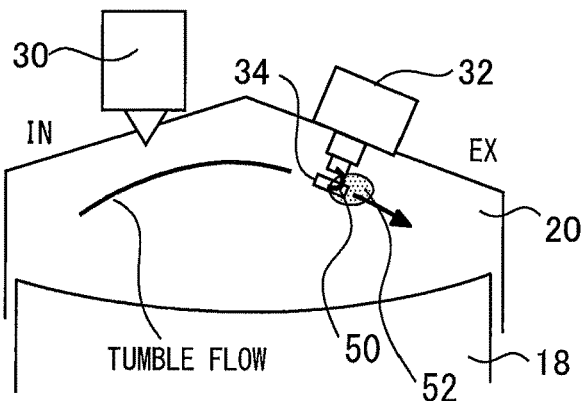
DURING IGNITION
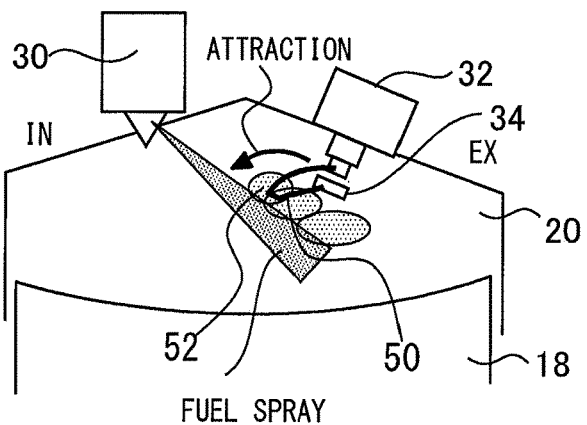
DURING EXPANSION STROKE INJECTION
Fig. 4

S10 IS CATALYST WARM-UP MODE SELECTED?
S12 DEVIATION AMOUNT OF ENGINE SPEED > THRESHOLD?
S14 ADDITIONAL IGNITION IS PERFORMED
S16 DEVIATION AMOUNT OF ENGINE SPEED > THRESHOLD?
S18 ADDITIONAL AMOUNT PERIOD IS EXTENDED

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-86260, filed on Apr. 25, 2017. The contents of these applications are incorporated herein by reference in their entirety.

TECHNICAL FIELD

The present disclosure relates to a control device for an internal combustion engine, and more particularly to a control device for an internal combustion engine which is configured to control a spark ignition engine comprising an injector which is configured to inject fuel into a cylinder of the engine.

BACKGROUND

JP2011-106377A discloses an engine comprising an injector which is configured to inject fuel into a cylinder and a spark plug which is configured to ignite air-fuel mixture in the cylinder. The injector and the spark plug are provided at an upper portion of a combustion chamber of the engine. The injector includes multiple injection ports. The injection ports include a inject port of which a central position is located closest to a central position of a discharge gap of the spark plug. In this engine, a distance between the central position of the central position of the discharge gap and that of the closest inject port is set in advance a certain distance.

The patent publication also discloses an engine control in which a high voltage is applied to the spark plug between after a lapse of a predetermined time from the start of fuel injection from the injector and the end of the fuel injection. To put it briefly, the engine control is a control in which an injection period is overlapped with an ignition period. The fuel splay immediately after the injection proceeds in the injection direction while taking away the surrounding air. Therefore, a low pressure part is formed in the injection period (entrainment). On the other hand, a discharge spark is generated on the discharge gap in the ignition period. Then, when the engine control in which an injection period is overlapped with an ignition period is performed, the discharge spark is attracted by the low pressure part. According to such attraction action, the ignitability of the air-fuel mixture formed around the spark plug can be improved.

In addition, the patent publication discloses an activation control of an exhaust gas cleaning catalyst at engine start as an application example of the attraction action. Although the patent publication does not refer to, the activation control of the exhaust gas cleaning catalyst is generally performed by setting the ignition period (i.e. an application period of the high voltage to the spark plug) on a retard side relative to compression top dead center TDC.

Suppose that when the engine control is applied to the general activation control, the fuel injection period is overlapped with the ignition period which is set on the retard side relative to the TDC. Therefore, according to the engine control, the same effect is expected as the engine control. However, since the activation control is performed during the engine start, combustion in the cylinder tends to unstable. When such an unstable combustion occurs frequently in cycles of the activation control, combustion fluctuation between cycles increase to affect performance of the engine.

The present disclosure addresses the above described problem, and an object of the present disclosure is to suppress combustion fluctuation between cycles when an engine control in which an ignition period is overlapped with a fuel injection period is applied to an activation control of an exhaust gas cleaning catalyst.

SUMMARY

The present disclosure provides a control device for an internal combustion engine which is configured to control an engine comprising an injector, a spark plug and an exhaust gas cleaning catalyst.

The injector is provided at an upper portion of a combustion chamber where tumble flow is generated. The injector is configured to inject fuel into a cylinder from multiple injection ports.

The spark plug is provided at the upper portion. The spark plug is configured to ignite a fuel-air mixture inside the cylinder by using a discharge spark. The spark plug is provided on a downstream side relative to the injector in a tumble flow direction at the upper portion. The spark plug is located at the downstream side of closest fuel spray among the fuel sprays injected from the multiple injection ports and is located closer to the upper portion than a contour surface of the closest fuel spray.

The exhaust gas cleaning catalyst is configured to clean exhaust gas from the combustion chamber.

The control device is configured to perform an engine control for activating the exhaust gas cleaning catalyst. In the engine control, the spark plug is controlled so as to generate discharge spark at an ignition period on a retard side of compression top dead center. In the engine control, the injector is controlled so that a first injection is performed on an advance side of the compression top dead center and a second injection whose injection period is overlapped with at least a part of the ignition period is performed on the retard side of the compression top dead center.

The control device is further configured to perform an engine control, when it is determined that a parameter relative to stability of the initial combustion exceeds a threshold, in which the spark plug is controlled so as to generate discharge spark additionally at an additional ignition period. The additional ignition period is ended at a crank angle on an advance side relative to the ignition period and also on a retard side relative to the compression dead center.

Since temperature and pressure inside the cylinder in the additional ignition period become higher than in the ignition period, when the spark plug is controlled so as to generate discharge spark at the additional ignition period, an initial flame is easily generated in the additional ignition period. Further, when the initial flame is generated in the additional ignition period, temperature around the spark plug increases. Therefore, flame is easily enlarged in the ignition period on the retard side relative to the additional ignition period. In other word, ignitability of the air-fuel mixture in the ignition period is stabilized.

The control device may be configured to fix the ignition period when the additional discharge spark is generated in the additional ignition period at the same crank angle period as the ignition period when the spark plug is not controlled in the additional ignition period.

When the spark plug is controlled in the additional ignition period, the ignition period subsequent thereto may be changed to more retard side. However, the change to the retard side tends to make the combustion unstable, and there is a possibility that an advantage obtained by the additional engine control with the additional ignition period may be hindered. In this regard, when the ignition period is fixed at the same crank angle before and after the execution of the engine control with the additional ignition period, it is possible to obtain the effect due to the advantage.

The control device may be configured to extend the additional ignition period when it is determined that the parameter exceeds the threshold again after the execution of the engine control with the additional ignition period.

When the additional ignition period is extended, the effect due to the advantage is increased.

The control device may be configured to set the additional ignition period to a longer period as deviation amount of the parameter from the threshold becomes larger.

When the additional ignition period is set to a longer period as the deviation amount becomes larger, it is possible to stabilize the ignitability in accordance with current combustion state.

The parameter may be engine speed.

When the engine speed is used as the parameter, determination processing relative to the stability of the initial combustion is simplified.

According to the control device of the present disclosure, combustion fluctuation between cycles can be suppressed even when the engine control in which the ignition period is overlapped with the fuel injection period is applied to the activation control of the exhaust gas cleaning catalyst.

BRIEF DESCRIPTION OF DRAWINGS

FIG. 4 is a view for describing an attraction action caused by expansion stroke injection;

DESCRIPTION OF EMBODIMENTS

Figure 1:
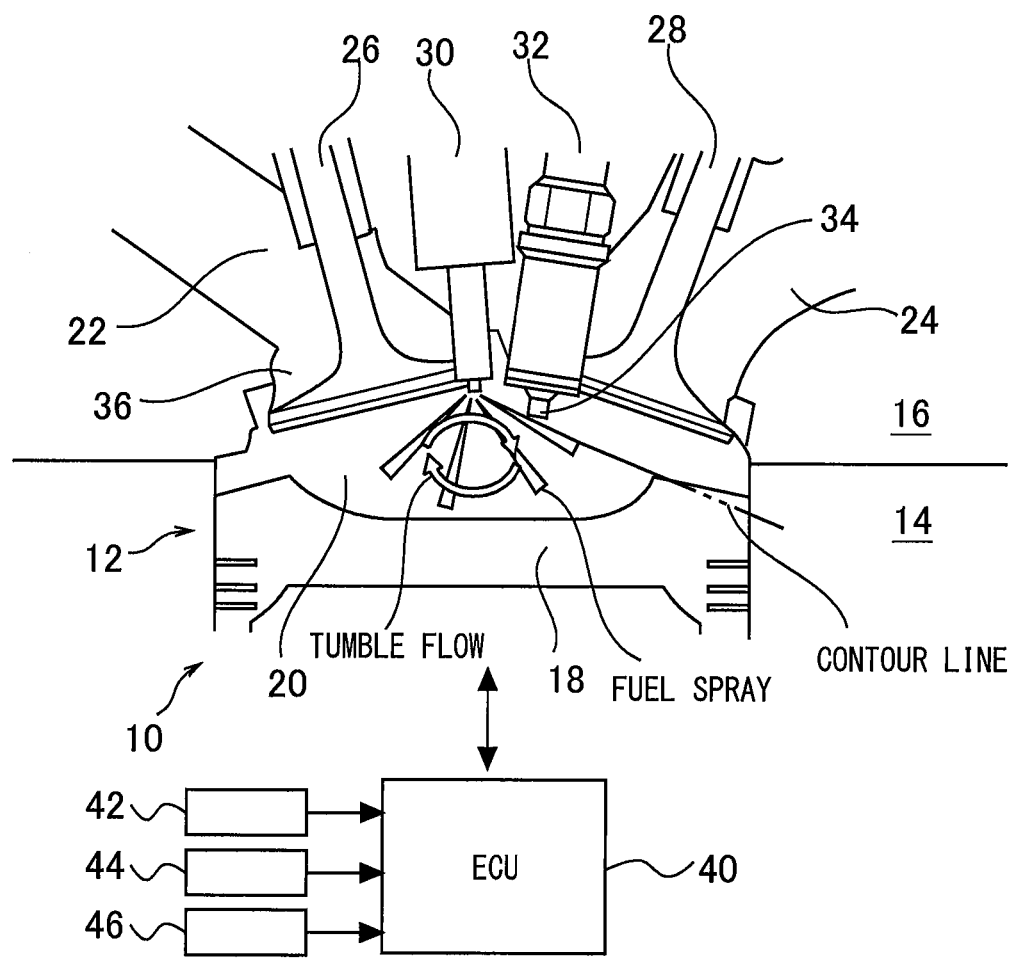
FIG. 1 is a view for describing a system configuration according to an embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

Description of System Configuration

FIG. 1 is a view for describing the system configuration according to an embodiment of the present disclosure. As illustrated in FIG. 1, a system according to the present embodiment includes an internal combustion engine (hereinafter also referred to as an "engine") 10 that is mounted in a vehicle. The engine 10 is a four-stroke, one-cycle engine that has a plurality of cylinders. However, only one cylinder 12 among the plurality of cylinders is depicted in FIG. 1. The engine 10 has a cylinder block 14 in which the cylinder 12 is formed, and a cylinder head 16 that is disposed above the cylinder block 14. In the cylinder 12, a piston 18 is arranged that reciprocates in the axial direction thereof (the vertical direction in the present embodiment). A combustion chamber 20 of the engine 10 is defined by at least a wall surface of the cylinder block 14, a bottom face of the cylinder head 16 and a top face of the piston 18.

In the cylinder head 16, two intake ports 22 and two exhaust ports 24 which communicate with the combustion chamber 20 are formed. An intake valve 26 is provided at an opening portion that communicates with the combustion chamber 20 of each intake port 22. An exhaust valve 28 is provided at an opening portion that communicates with the combustion chamber 20 of each exhaust port 24. An injector 30 is provided in the cylinder head 16 so that a tip thereof faces the combustion chamber 20 from approximately the center of an upper portion of the combustion chamber 20. The injector 30 is connected to a fuel supply system that is constituted by a fuel tank, a common rail, a supply pump and the like. A plurality of injection ports are formed in a radial shape in the tip of the injector 30. When the injector 30 is opened, fuel is injected in a high pressure state from the injection ports.

In the cylinder head 16, a spark plug 32 is provided at an upper portion of the combustion chamber 20 at a position that is further to the side of the exhaust valve 28 in comparison to the location at which the injector 30 is provided. The spark plug 32 includes, at the tip thereof, an electrode portion 34 that is constituted by a center electrode and a ground electrode. The electrode portion 34 is arranged so as to project into an area that is above a contour surface of a fuel spray (hereinafter also referred to as "spray contour surface" of the injector 30 (that is, into an area from the spray contour surface to the bottom face of the cylinder head 16)). More specifically, the electrode portion 34 is arranged so as to project into an area that is above a contour surface of a fuel spray that comes closest to the spark plug 32 among fuel sprays (hereinafter also referred to as a "closest fuel spray") ejected in a radial shape from the injection ports of the injector 30. Note that, a contour line drawn in FIG. 1 represents a contour surface of the closest fuel spray.

The intake port 22 extends approximately straight in the direction of the combustion chamber 20 from an inlet on the intake passage side, and the channel cross-sectional area is narrowed down at a throat 36 that is a connecting portion with the combustion chamber 20. This shape of the intake port 22 generates a tumble flow in intake air that is supplied from the intake port 22 to the combustion chamber 20. The tumble flow swirls inside the combustion chamber 20. More specifically, at the upper portion of the combustion chamber 20 the tumble flow moves from the intake port 22 side toward the exhaust port 24 side, and on the exhaust port 24 side the tumble flow moves from the upper portion of the combustion chamber 20 toward the lower portion thereof. Further, at the lower portion of the combustion chamber 20 the tumble flow moves from the exhaust port 24 side to the intake port 22 side, and on the intake port 22 side the tumble flow moves from the lower portion of the combustion chamber 20 toward the upper portion thereof. A depression for holding the tumble flow is formed in the upper face of the piston 18 that forms the bottom portion of the combustion chamber 20.

In the present embodiment, tumble ratio TR of the tumble flow (angular velocity of the tumble flow/engine speed) is set to a high value of 3.5 or more. The reason for this is that the engine 10 is configured to aim at a high compression ratio and massive introduction of EGR gas in an operation region with high use frequency. As the compression ratio increases, turbulence in the cylinder decreases. Therefore, when a large amount of EGR gas is introduced into the cylinder with low turbulence, the combustion resistance in the above operation region decreases. For this reason, the tumble ratio TR is set to the high value. Note that the tumble flow is not limited to the one generated by the throat 36. For example, the tumble flow may be generated by controlling an opening degree of a tumble control valve TCV which is provided in the intake path such as the intake port 22.

Further, as illustrated in FIG. 1, the system according to the present embodiment includes an ECU (electronic control unit) 40 as a control device. The ECU 40 includes a RAM (random access memory), a ROM (read only memory), a CPU (central processing unit) and the like. The ECU 40 performs processing to take in signals of various sensors that are mounted in the vehicle. The various sensors include at least a pressure sensor 42 that is configured to detect pressure in the cylinder (in-cylinder pressure), a crank angle sensor 44 that is configured to detect a rotation angle of a crankshaft that is connected to the piston 18, and a temperature sensor 46 that is configured to detect a coolant temperature or an oil temperature of the engine 10. The ECU 40 processes the signals of the respective sensors that are taken in, and actuates various actuators in accordance with a predetermined control program. The actuators that are operated by the ECU 40 include at least the injector 30 and the spark plug 32.

[Startup Control by ECU 40]

In the present embodiment, the ECU 40 shown in FIG. 1 performs a control in which activation of an exhaust gas cleaning catalyst is promoted (hereinafter also referred to as "catalyst warm-up control") as an engine control being performed immediately after a cold startup of the engine 10. The exhaust gas cleaning catalyst is a catalyst that is provided in an exhaust passage of the engine 10. A three-way catalyst that purifies nitrogen oxides (NOx), hydrocarbon (HC) and carbon monoxide (CO) contained in exhaust gas when the atmosphere of the catalyst that is in an activated state is in the vicinity of stoichiometry may be mentioned as one example of the exhaust gas cleaning catalyst. The catalyst warm-up control is performed in a preset period in which a transmission gear is in a neutral state after the start of the engine 10. The preset period is calculated by the ECU 40 based on the detected value of the temperature sensor 46 at the cold startup of the engine 10.

Figure 2:
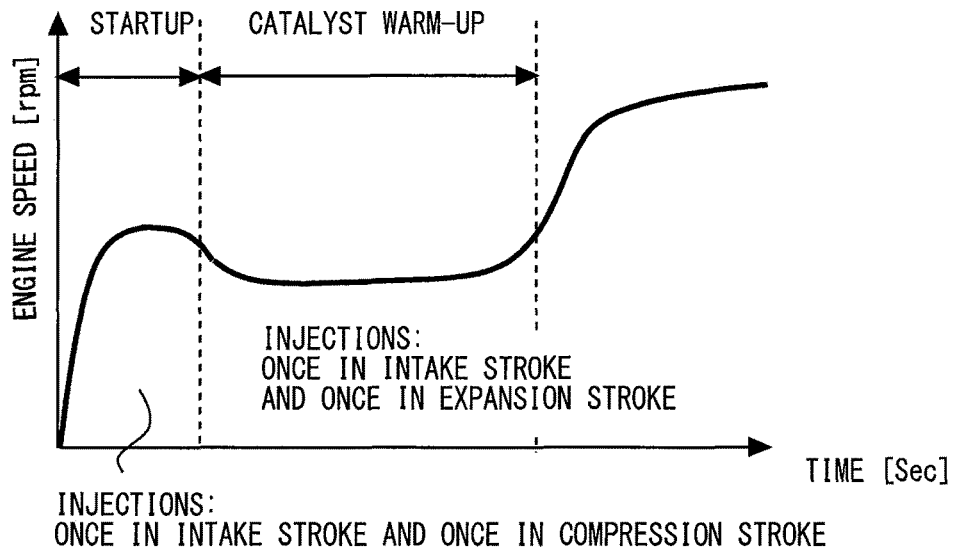
FIG. 2 is a view for illustrating an example of a fuel injection pattern immediately after startup of an internal combustion engine 10.

The catalyst warm-up control will now be described referring to FIGS. 2 and 3. FIG. 2 illustrates an example of a fuel injection pattern immediately after the cold startup of the engine 10. As illustrated in FIG. 2, immediately after startup, first, a fuel injection pattern is adopted in which an injection in an intake stroke (hereinafter also referred to as an "intake stroke injection") and an injection in a compression stroke (hereinafter also referred to as a "compression stroke injection") are combined. Thereafter, a temporary rise in the engine speed converges, the fuel injection pattern is changed to start the catalyst warm-up control. More specifically, the compression stroke injection is switched to an injection in an expansion stroke (hereinafter also referred to as "expansion stroke injection"). That is, in the catalyst warm-up control, a fuel injection pattern that combines the intake stroke injection and the expansion stroke injection is adopted.

Figure 3:
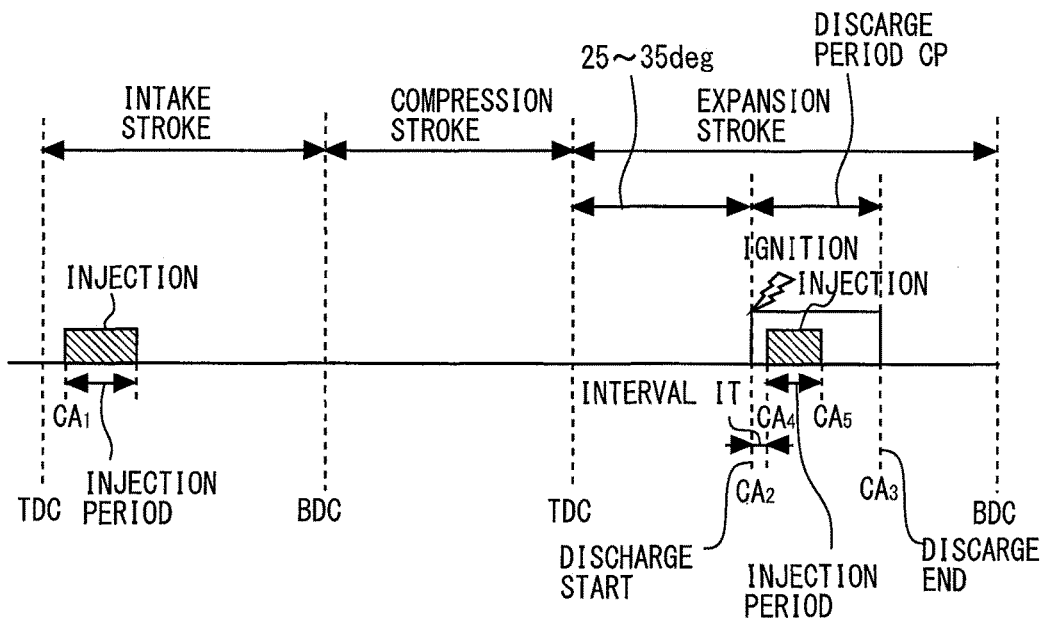
FIG. 3 is a view for illustrating injection start timings, injection periods and a discharge period at an electrode portion during catalyst warm-up control.

FIG. 3 illustrates injection start timings, injection periods, and a discharge period (an ignition period) at the electrode portion during catalyst warm-up control. As illustrated in FIG. 3, the intake stroke injection is started at a crank angle $CA_1$ (as one example, in the vicinity of BTDC 300° to 280°). The discharge period CP of the electrode portion is set in a retard side of the TDC. The reason why the discharge period CP is in the retard side of TDC is to raise the exhaust gas temperature. The expansion stroke injection is performed during the discharge period CP. More specifically, the discharge period CP is set from a crank angle $CA_2$ (as one example, in the vicinity of ATDC 20° to 35°) to a crank angle $CA_3$. The expansion stroke injection is started at a crank angle $CA_4$ on the retard side relative to the crank angle $CA_2$ and ended at a crank angle $CA_5$ on the advance side relative to the rank angle $CA_3$.

Although FIG. 3 illustrates an interval IT between the crank angle $CA_2$ and the crank angle $CA_4$. However, the interval IT may be zero. That is, the crank angle $CA_2$ may match the crank angle $CA_4$. Moreover, the interval IT may be a negative value. That is, the crank angle $CA_4$ may be positioned on the advance side relative to the crank angle $CA_2$. The relation between the crank angle $CA_2$ and the crank angle $CA_4$ also holds between the crank angle $CA_3$ and the crank angle $CA_5$. In other words, the crank angle $CA_5$ may match the crank angle $CA_3$ or may be positioned on the advance side relative to the crank angle $CA_3$. The crank angles $CA_2$, $CA_3$, $CA_4$ and $CA_5$ can be set as long as at least a part of the injection period of the expansion stroke injection overlaps with the discharge period CP. This is because that an attraction action described later is obtained if the overlap condition is fulfilled.

[Fuel Injection Amount During the Catalyst Warm-Up Control]

In each cycle during the catalyst warm-up control, total injection amount from the injector 30 (that is, sum of the fuel injection amount for the intake stroke injection and the fuel injection amount for the expansion stroke injection) is calculated so that air-fuel ration A/F in the cylinder is maintained at a constant value (for example, 14.3). When the air-fuel ratio A/F in the cylinder is maintained at the constant value, an increase of the combustion fluctuation between cycles caused by fluctuation in the air-fuel ratio A/F is suppressed. Note that the injection amount for the expansion stroke is fixed at an amount in consideration of the combustion fluctuation caused by the expansion stroke injection and emission from the engine 10 (as one example, from 3 to 5 mm³/st). Therefore, fuel amount for the intake stroke injection is calculated by taking out the fixed constant from the total injection amount from the injector 30.

[Catalyst Warm-Up Control Utilizing Attraction Action and Issue Relating Thereto]

FIG. 4 is a view for describing an attraction action caused by the expansion stroke injection. Note that, for convenience of description, only the closest fuel spray is illustrated in FIG. 4.

The upper diagram of FIG. 4 illustrates a cylinder condition during the intake stroke injection. A shown in the upper diagram, the tumble flow is generated in the combustion chamber 30. The fuel spray caused by the intake stroke injection swirls in the combustion chamber 20 in the tumble flow direction. The fuel spray swirling is mixed with intake air in the combustion chamber 20 to form air-fuel mixture.

The middle diagram of FIG. 4 illustrates a cylinder condition immediately before the expansion stroke injection during the discharge period of the electrode portion 34. As shown in the middle diagram, an initial flame 52 is generated from a discharge spark 50 on the electrode portion 34. The initial flame 52 is generated due to the discharge spark 50 and the air-fuel mixture around the electrode portion 34. The air-fuel mixture is derived from the fuel spray caused by the intake stroke injection.

The lower diagram of FIG. 4 illustrates a cylinder condition immediately after the expansion stroke injection. As shown in the lower diagram, when the expansion stroke injection is performed, a low pressure part is formed around the closest fuel spray (entrainment). Therefore, the discharge spark 50 and the initial flame 52 are attracted in an opposite direction from the tumble flow direction. Then, as shown in the lower diagram, the discharge spark 50 and the initial flame 52 contact with the closest fuel spray caused by the expansion stroke injection and enlarges by involving the closest fuel spray. The extension of the initial flame 52 associated with the attraction action continues until the end of the expansion stroke injection. Both of the discharge spark 50 and the initial flame 52 are attracted from the start of the expansion stroke injection to the end of the discharge period. On the other hand, only the initial flame 52 is attracted from the end of the discharge period to the end of the expansion stroke injection. This is because the discharge spark 50 disappears after the end of the discharge period.

As mentioned above, the extension of the initial flame 52 associated with the attraction action is started as long as the initial flame 52 is generated at least before the end of the expansion stroke injection. In other word, when at least a part of the injection period of the expansion stroke injection overlaps with the discharge period, the initial flame 52 can be enlarged by the attraction action of the closest fuel spray caused by the expansion stroke injection. The enlarged initial flame 52 is further enlarged by involving a remaining air-fuel mixture in the combustion chamber 20. The remaining air-fuel mixture is an air-fuel mixture which is derived from the fuel spray caused by the intake stroke injection and did not contribute to the generation of the initial flame.

In the meantime, if an environment in the cylinder is changed due to some factors and therefore is out of a desired range, a combustion during the catalyst warm-up control may become unstable. For example, when a protruding amount of the spark plug from the cylinder head is changed due to an exchange of the spark plug to a new one, a distance between the electrode portion and the outer surface of the closest fuel spray is enlarged. Similarly, when a spray angle changes due to deposition of deposits in the injection hole of the injector, the distance between the electrode portion and the outer surface of the closest fuel spray is enlarged. When the distance is enlarged, the combustion state tends to become unstable. Also, when the tumble flow is strong (that is, when the tumble ratio TR is high) or when a low volatile heavy fuel is used, the combustion state tends to be unstable.

Figure 5:
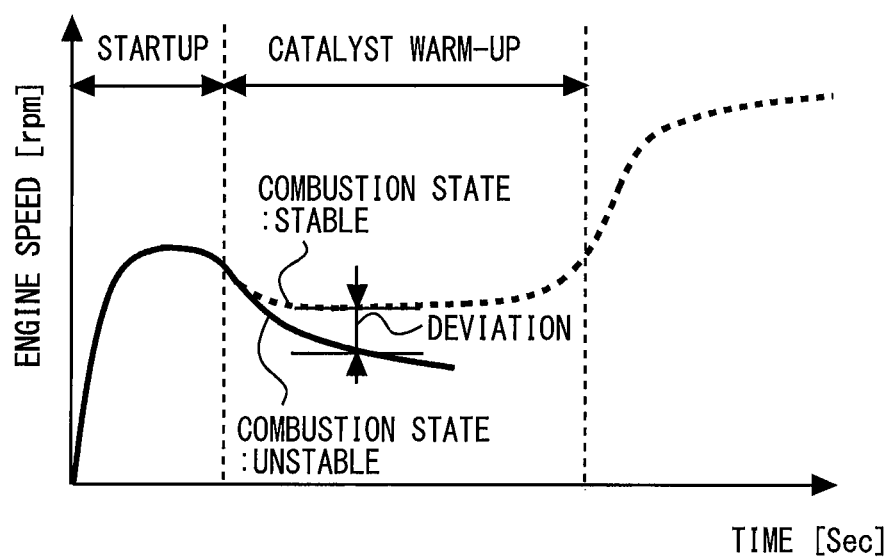
FIG. 5 is a view for illustrating transition of engine speed during the catalyst warm-up control.

FIG. 5 is a view for illustrating transition of engine speed during the catalyst warm-up control. The broken line shown in FIG. 5 represents the transition of the engine speed at a stable combustion and the solid line represents the transition of the engine speed at an unstable combustion. As can be seen by comparing the two lines, the engine speed becomes substantially constant at the stable combustion, while the engine speed continues to decrease at the unstable combustion. Therefore, if a decrease in the engine speed is detected after the start of the catalyst warm-up control, it can be determined that combustion state becomes unstable.

Figure 6:
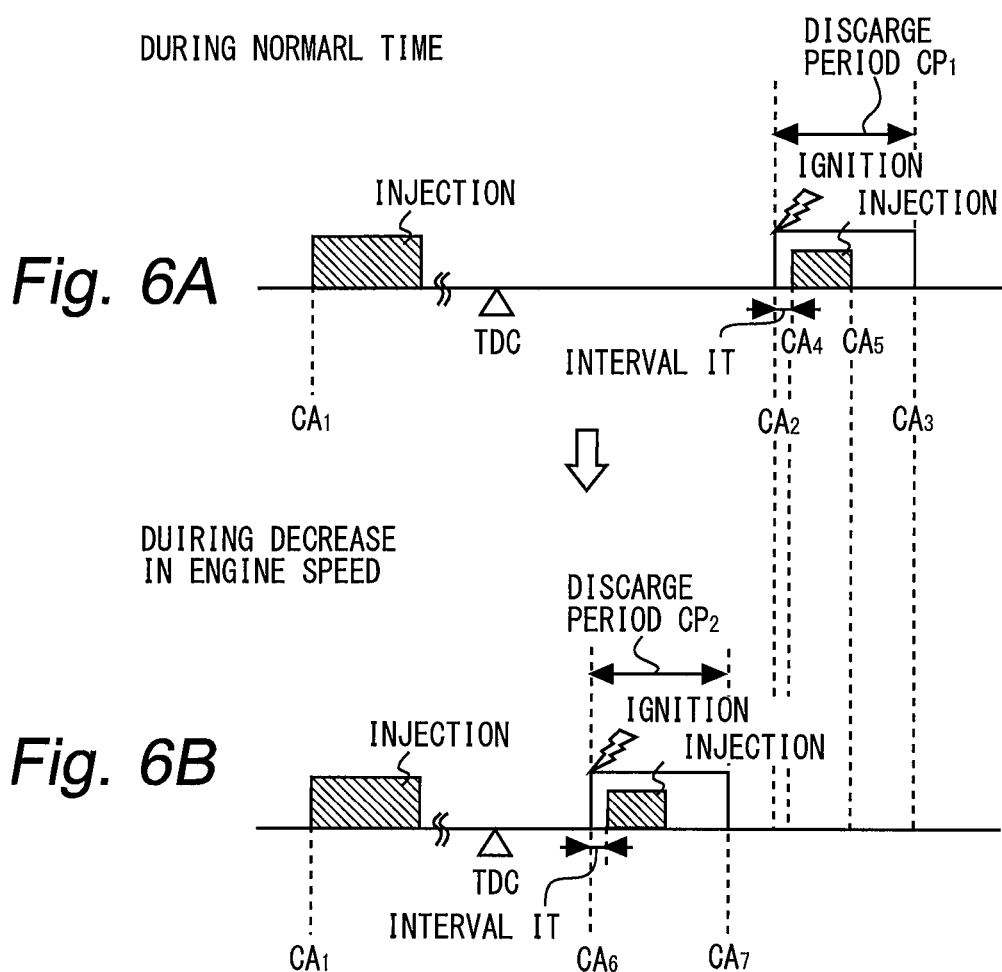
FIGS. 6A and 6B are views for describing an example of countermeasure when the combustion state becomes unstable.

If the discharge period is advanced to the TDC side, the combustion state can be restored. FIGS. 6A and 6B are views for describing an example of countermeasure when the combustion state becomes unstable. The crank angles $CA_1$ to $CA_5$ shown in the FIG. 6A are as described in FIG. 3. FIG. 6B corresponds to a countermeasure example when the combustion state becomes unstable. In this countermeasure example, the discharge period $CP_1$ is changed to advance angle side. The changed discharge period $CP_2$ is from a crank angle $CA_6$ (for example, ATDC 5° to 20°) to a crank angle $CA_7$.

The interval IT is not changed before and after the change of the discharge period CP. This is because when the advance of the discharge period CP and the change of the interval IT are performed at the same time, the injection period of the expansion stroke injection may not overlap with the changed discharge period $CP_2$. When the overlap does not occur, the initial flam is not attracted by the low pressure part. To avoid such case, in the present embodiment, when the discharge period CP is changed to advance angle side, the injection period of the expansion stroke injection is changed to the same side. However, when the injection period of the expansion stroke injection is changed to advance side, the changed injection period approaches TDC. Then, amount of fuel adhering to the top surface of the piston increases. Then, PN (Particulate Number) which is one of the control subjects of emission increases.

[Characteristics of Catalyst Warm-Up Control in First Embodiment]

Therefore, in the present embodiment, when it is determined that the combustion state during the catalyst warm-up control is unstable, an additional ignition is performed on the TDC side relative to the discharge period $CP_1$. FIGS. 7A to 7C are views for describing a characteristic of the catalyst warm-up control according to the present embodiment. The crank angles $CA_1$ to $CA_5$ shown in FIG. 7A are the same as described in FIG. 3. FIG. 7B corresponds to a first countermeasure example in the catalyst warm-up control of the present embodiment. In the first countermeasure example, an additional ignition period (a discharge period $CP_2$) is provided on the TDC side relative to the ignition period at the normal time (i.e. the discharge period $CP_1$) while performing normal ignition and injection. The discharge period $CP_2$ is set to the same length as the discharge period $CP_1$.

In one engine cycle, the temperature (or pressure) in the cylinder during the discharge period $CP_2$ becomes higher than that during the discharge period $CP_1$. Therefore, when the discharge period $CP_2$ is additionally provided, the initial flame is relatively easily generated. If the initial flame is generated during the discharge period $CP_2$, the temperature around the electrode portion rises. Therefore, it is possible to stabilize the ignitability of the air-fuel mixture during the discharge period $CP_1$. In other words, the combustion state can be improved.

Figure 7:
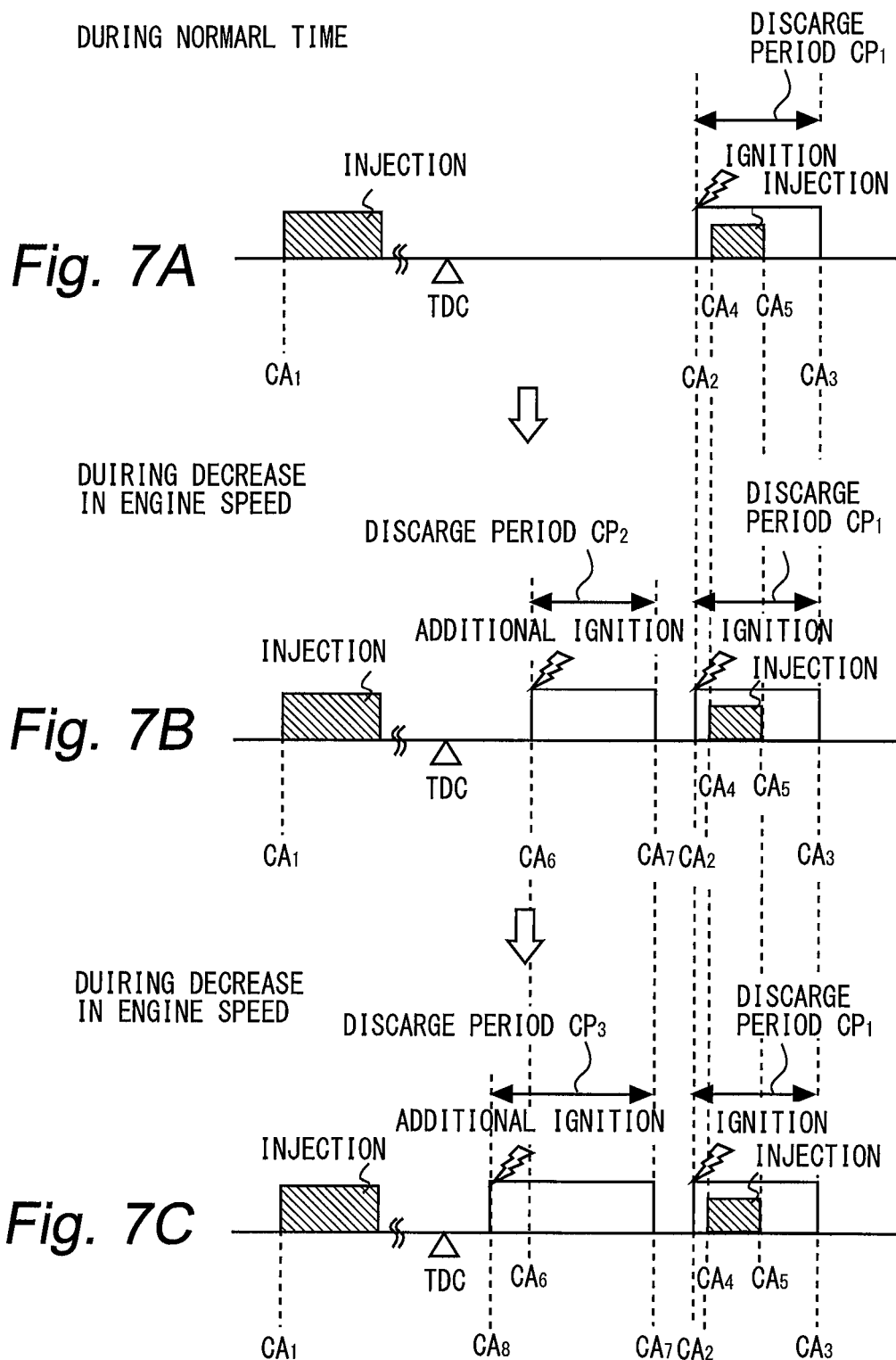
FIGS. 7A to 7C are views for describing a characteristic of the catalyst warm-up control according to the embodiment of the present disclosure.

Note that in FIG. 7, the length of the discharge period $CP_2$ and the discharge period $CP_1$ are the same length. However, the length of the discharge period $CP_2$ may be arbitrarily changed as long as the initial flame is generated during the discharge period $CP_2$. For example, a start crank angle $CA_6$ of the discharged period $CP_2$ may be set in the advanced side relative to the TDC. However, if all period of the discharge period $CP_2$ is set on the advance side relative to the TDC, the combustion state becomes rather unstable. Therefore, unlike the start crank angle $CA_6$, it is necessary to set an end crank angle $CA_7$ of the discharge period $CP_2$ to the advance angle side relative to the TDC.

FIG. 7C corresponds to a second countermeasure example in the catalyst warm-up control of the present embodiment. The second countermeasure example is carried out when it is determined that the combustion state is still unstable despite the first countermeasure example shown in FIG. 7B. In the second countermeasure example, an additional ignition period (discharge period $CP_3$) is provided on the TDC side relative to the ignition period at the normal time (i.e. the discharge period $CP_1$). The discharge period $CP_3$ is provided instead of the discharge period $CP_2$. The discharge period $CP_3$ is set to a longer period than the discharge period $CP_2$. The discharge period $CP_3$ is from a crank angle CM (for example, from TDC to ATDC 15°) to the crank angle $CA_7$.

Since ignition energy is proportional to the discharge period, the ignition energy generated in the discharge period $CP_3$ is larger than that in the discharge period $CP_2$ (for example, the energy during the discharge period $CP_2$ is 80 mJ, the energy during the discharge period $CP_3$ is 200 mJ). Therefore, when the discharge period $CP_3$ is additionally provided, the temperature around the electrode portion rises to a higher temperature as compared with the case where the discharge period $CP_2$ is only provided. Therefore, it is possible to reliably stabilize the ignitability of the air-fuel mixture in the discharge period $CP_1$. In other words, the combustion state can be stabilized with high probability.

Figure 8:
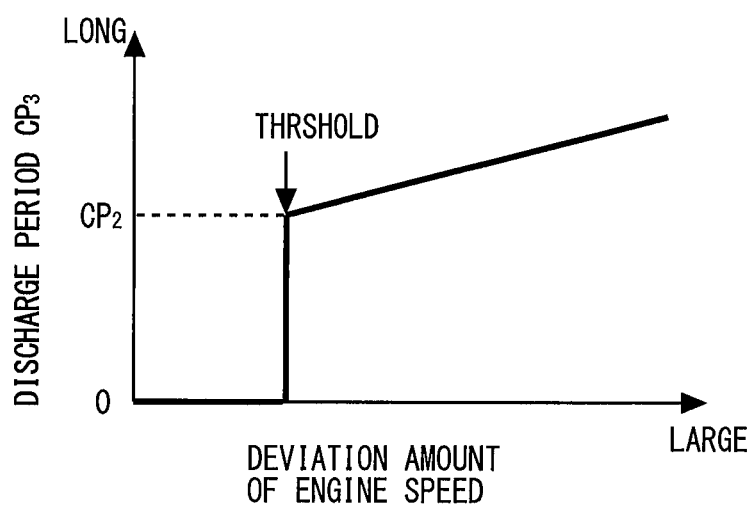
FIG. 8 is a view for describing an example of a setting method of the discharge period $CP_3$.

FIG. 8 is a view for describing an example of a setting method of the discharge period $CP_3$. When a deviation amount of the engine speed is larger than a threshold value, the discharge period $CP_3$ is set to be longer as the deviation amount becomes larger. The amount of divergence is calculated as the difference between the engine speed at the start of catalyst warm-up control and the engine speed during the determination regarding combustion stability. The threshold value to be compared with the divergence amount is the one used for determining whether the performance of the first countermeasure example is needed or not.

[Specific Processing in First Embodiment]

Figure 9:
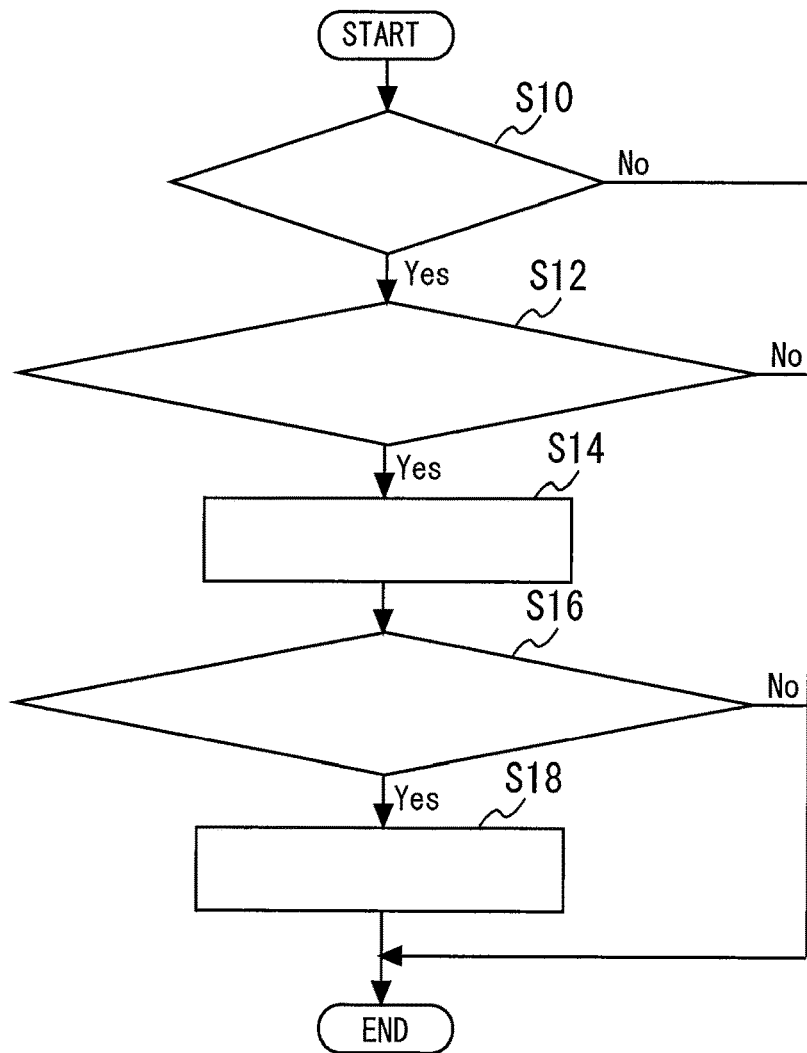
FIG. 9 is a flowchart for illustrating an example of processing that an ECU 40 shown in FIG. 1 executes in the embodiment of the present disclosure.

FIG. 9 is a flowchart for illustrating an example of processing that the ECU 40 executes in the present embodiment. Note that the routine shown in FIG. 9 is repeatedly executed for each cycle in each cylinder after the startup of the engine 10.

In the routine shown in FIG. 9, the ECU determines whether an operation mode to execute the catalyst warm-up control (hereinafter also referred to as "catalyst warm-up mode") is selected or not (step S10). The catalyst warm-up mode is selected, for example, when the cooling water temperature detected by the temperature sensor 46 shown in FIG. 1 is higher than predetermined value or more. If the determination result in the step S10 is negative, the ECU exits this routine.

If the determination result in the step S10 is positive, the ECU determines whether the amount of divergence of the engine speed is larger than the threshold value (step S12). If the determination result in the step S12 is negative, the ECU exits this routine.

If the determination result in the step S12 is positive, it is estimated that the combustion state is unstable. Therefore, in this case, the ECU controls the spark plug so that the additional ignition is performed (step S14). The additional ignition performed by the processing in the step S14 is the first countermeasure described above.

Subsequent to the step S14, the ECU determines whether the amount of divergence of the engine speed is larger than the threshold value (step S16). If the determination result in the step S16 is negative, it is estimated the combustion state becomes stable through the additional ignition by the processing in the step S14. Therefore, in this case, the ECU exits this routine.

If the determination result in the step S16 is positive, it is estimated that the combustion state is still unstable despite the additional ignition by the processing in the step S14. Therefore, in this case, the ECU controls the spark plug so that the length of the additional ignition is extended (step S18). The extended additional ignition performed by the processing in the step S18 is the second countermeasure described above.

As described above, according to the routine illustrated in FIG. 9, the additional ignition is performed when it is determined that the combustion state during the catalyst warm-up control is unstable. Therefore, the combustion state can be improved. Moreover, when it is determined that the combustion state is still unstable despite the additional ignition, the ignition energy can be increased by prolonging the period of the additional ignition. Therefore, it is possible to stabilize the combustion state with high probability.

Other Embodiment

In the embodiment mentioned above, the engine configuration is adopted in which the tumble flow in the combustion chamber 20 swirls on the exhaust port 24 side so as to travel from the upper portion of the combustion chamber 20 toward the lower portion thereof, and swirls on the intake port 22 side so as to travel from the lower portion of the combustion chamber 20 toward the upper portion thereof. However, an engine configuration may be adopted in which the tumble flow swirls in the opposite direction. However, in this case, it is necessary to change the location at which the spark plug 32 is arranged from the exhaust valve 28 side to the intake valve 26 side. If the location at which the spark plug 32 is arranged is changed in this manner, the spark plug 32 will be positioned on the downstream side of the injector 30 in the flow direction of the tumble flow thereby the attraction action caused by the expansion stroke injection is obtained.

In the embodiment mentioned above, as described in FIG. 2, an injection pattern combining the intake stroke injection and the expansion stroke injection is adopted as the injection pattern during the catalyst warm-up control. However, like the fuel injection pattern which is adopted immediately after startup, an injection pattern combining the compression stroke injection and the expansion stroke injection may be adopted as the injection pattern during the catalyst warm-up control. In addition, number of times of the intake stroke injection need not be one. That is, the intake stroke injection may be divided into two or more injections. Further, a part of the divided injection may be performed in the intake stroke whereas the remaining injection may be performed in the compression stroke. In this manner, an implementation period and number of times of the fuel injection (first injection) combined with the expansion stroke injection (second injection) can be variously modified.

Further, in the above embodiment, the determination on the stability of the combustion state is performed based on the comparison between the deviation amount of the engine speed and the threshold value. However, a similar determination to the determination on the stability of the combustion state may be performed based on combustion fluctuation between cycles and a threshold value. That is, the similar determination based on a comparison with a parameter relating to the stability of the combustion state and a threshold being set separately may be performed instead of the determination described in the above embodiment.

Further, in the above embodiment, the discharge period CP (i.e. the discharge period $CP_1$ shown in FIG. 7A) is not changed whereas the additional discharge period (i.e. the discharge period $CP_2$ or $CP_3$ shown in FIG. 7B or 7C) is provided. However, when providing the additional discharge period, the discharge period CP may be changed to the retard side. However, the changing of the discharge period CP to the retard side tends to make the combustion state unstable. Therefore, when providing the additional discharge period, it is desirable not to change the discharge period CP. Changing the discharge period CP to the advance side is not desirable because the fuel adhesion described in FIGS. 6A and 6B occurs and an energy to be charged into the exhaust purification catalyst decreases.

In the above embodiment, the additional ignition period $CP_2$ is set to the same length as the discharge period $CP_1$ and the additional ignition period $CP_3$ is extended according to the divergence amount. However, the additional ignition period $CP_2$ may be set the same length as the discharge period $CP_3$. That is, the additional ignition period $CP_2$ may be set a larger period than the discharge period $CP_1$ from the stage where it is determined for the first time that the combustion state is unstable.

What is claimed is:

1. A control device for controlling an internal combustion engine which is configured to control an engine,
    wherein the engine comprising:
    an injector which is provided in an upper portion of a combustion chamber where tumble flow is generated, the injector is configured to inject fuel into a cylinder from multiple injection ports;
    a spark plug which is provided at the upper portion and is configured to ignite a fuel-air mixture inside the cylinder by using a discharge spark, the spark plug is provided on a downstream side relative to the injector in a tumble flow direction at the upper portion, the spark plug is located at the downstream side of closest fuel spray among the fuel sprays injected from the multiple injection ports and is located closer to the upper portion than a contour surface of the closest fuel spray; and
    an exhaust gas cleaning catalyst that is configured to clean exhaust gas from the combustion chamber,
    wherein the control device is configured to perform an engine control for activating the exhaust gas cleaning catalyst in which the spark plug is controlled so as to generate discharge spark at an ignition period on a retard side of compression top dead center and the injector is controlled so that a first injection is performed on an advance side of the compression top dead center and a second injection whose injection period is overlapped with at least a part of the ignition period is performed on the retard side of the compression top dead center,
    wherein the control device is further configured to perform an engine control, when it is determined that a parameter relative to stability of the initial combustion exceeds a threshold, in which the spark plug is controlled so as to generate discharge spark additionally at an additional ignition period, wherein the additional ignition period is ended at a crank angle on an advance side relative to the ignition period and also on a retard side relative to the compression dead center.

2. The control device according to claim 1,
    wherein the control device is further configured to fix the ignition period when the additional discharge spark is generated in the additional ignition period at the same crank angle period as the ignition period when the spark plug is not controlled in the additional ignition period.

3. The control device according to claim 1,
    wherein the control device is further configured to extend the additional ignition period when it is determined that the parameter exceeds the threshold again after the execution of the engine control with the additional ignition period.

4. The control device according to claim 1,
    wherein the control device is further configured to set the additional ignition period to a longer period as deviation amount of the parameter from the threshold becomes larger.

5. The control device according to claim 1,
    wherein the parameter is engine speed.

* * * * *